W. A. LEWIS.
COIN HOLDER.
APPLICATION FILED MAY 23, 1912.
1,061,551. Patented May 13, 1913.
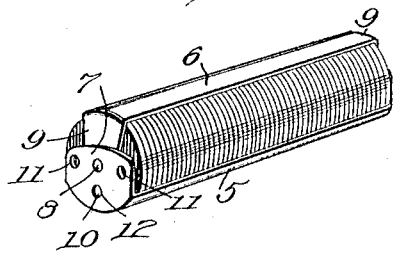
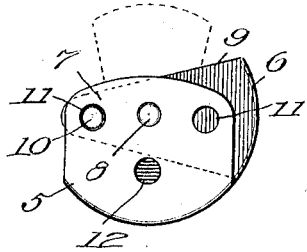 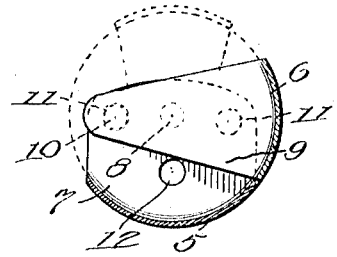
WITNESSES
INVENTOR
Walter A. Lewis
BY
Attorney

UNITED STATES PATENT OFFICE.

WALTER A. LEWIS, OF BATAVIA, IOWA.

COIN-HOLDER.

1,061,551.  Specification of Letters Patent.  Patented May 13, 1913.

Application filed May 23, 1912. Serial No. 699,181.

*To all whom it may concern:*

Be it known that I, WALTER A. LEWIS, a citizen of the United States, residing at Batavia, in the county of Jefferson and State of Iowa, have invented certain new and useful Improvements in Coin-Holders, of which the following is a specification.

This invention relates to devices for holding a definite number of coins for convenience in storage or handling, and its object is to provide a device of this kind which is simple in construction and which can be easily operated to lock and release the coins.

The invention consists in a novel construction and arrangement of parts to be hereinafter described and claimed, reference being had to the accompanying drawing, in which—

Figure 1 is a perspective view of the device; Fig. 2 is an end view of the device in open position, and Fig. 3 is a cross-section thereof.

Referring specifically to the drawing, the device comprises two longitudinal bars 5 and 6, respectively, which are pivotally connected so that they may be spread apart to partially encircle the coins. The bars are concavo-convex in cross section, and they are so connected that the concave sides are on the inside when they are spread, said sides being designed to snugly fit the edge of the coins. At the ends of the bar 5 are outstanding ears 7 having a central pivot opening to receive pivot studs 8 on outstanding ears 9 at the ends of the bar 6, whereby the pivot connection between said bars is had. The pivot studs 8 are intermediate the ends of the ears 9, and close to said ends, the ears 9 are provided with studs 10. On opposite sides of the pivot opening of the ears 7, said ears have apertures 11 and below said pivot opening is an aperture 12. These apertures are equidistant from the pivot opening, and the studs 10 are adapted to snap thereinto to lock the bars 5 and 6 in open or closed position. When the bar 6 is swung to the left, the studs 10 snap into the apertures 11 to the right of the pivot opening, and when swung to the right, the studs snap into the left aperture. When the bar 6 is swung outward so as to come into position diametrically opposite to the bar 5, the studs 10 snap into the apertures 12.

The bars 5 and 6 are so shaped that when they are positioned side by side, they form a closed trough which is substantially semicircular in cross-section, the ends of the trough being formed by the ears 7 and 9. This is the position of the parts when the device is open and ready to receive coins, and when thus in open position it may be placed on the counter without danger of tilting over and spilling the coins. After the device is filled, the bar 6 will be swung outward from the bar 5 until it comes diametrically opposite the latter, in which position it is locked by the studs 10 snapping into the apertures 12 as already described. When the bar 6 is swung outward as stated, it rides freely over the edge of the coins and the latter do not interfere with the movement of said bar to closed position.

The device will be made in various sizes to suit coins of different denominations and also different quantities of coins. The device is also simple in construction it being composed of two pieces, in view of which it can be cheaply and easily manufactured. The curvature of the bars 5 and 6 stiffens the same so that they are not liable to bend out of shape.

When the device is empty and the two bars are placed together side by side, it takes up very little space, and the bars are securely held in this position by the studs 10 as hereinbefore described.

When the device is filled, it may be placed in erect position without danger of toppling over.

When the device is opened up to receive the coins the latter can be dropped thereinto direct, and they do not touch the counter or table on which the device is resting, the bottom of the trough formed by the two bars 5 and 6 when in position side by side being closed, and no part of the coins projecting downward from said bottom. The device can then be closed without removing it from its resting place.

I claim:

A coin holder comprising a pair of longitudinal bars which are curved in cross-section and adapted to be placed side by side to form a trough having a closed bottom, outstanding overlapped ears on the ends of the bars, said ears forming the ends of the trough, and a pivotal connection between the ears of the respective bars, the ears of one of the bars having a locking stud, and the ears of the other bar having apertures to receive said stud, two of said apertures being located on opposite sides of the aforesaid pivotal connection, and one aperture being located in the path of the locking stud midway between the first-mentioned apertures.

In testimony whereof I affix my signature in presence of two witnesses.

WALTER A. LEWIS.

Witnesses:
A. M. Lewis,
M. M. Lewis.

Copies of this patent may be obtained for five cents each, by addressing the "Commissioner of Patents, Washington, D. C."